United States Patent [19]
Brackett

[11] 3,820,413
[45] June 28, 1974

[54] METHOD AND APPARATUS FOR POWER TRANSMISSION UTILIZING A WORM DRIVE

[76] Inventor: George E. Brackett, Apt. 241-A Condo 7 Heritage Village, Southbury, Conn. 06488

[22] Filed: Dec. 14, 1972

[21] Appl. No.: 315,090

[52] U.S. Cl.................. 74/425, 74/415, 74/465
[51] Int. Cl. ...... F16h 1/16, F16h 1/06, F16h 55/06
[58] Field of Search ..... 74/465 X, 458, 415 X, 425, 74/424.6

[56] References Cited
UNITED STATES PATENTS
| | | | |
|---|---|---|---|
| 3,597,990 | 8/1971 | McCartin | 74/458 X |
| 3,648,535 | 3/1972 | Maroth | 74/465 X |
| 3,720,115 | 3/1973 | Vertin | 74/465 X |

Primary Examiner—Leonard H. Gerin

[57] ABSTRACT

A worm drive for power transmission combines a worm screw with a worm wheel comprising an annular body having a concaved outer peripheral surface. A multiplicity of roller members are located in roller retaining sockets formed in said outer concaved peripheral surface and arranged in a series of spaced apart rows. Each of the roller members is positioned in a manner such that its central axis of rotation extends radially inwardly in relation to the central axis of the rotation of the worm screw. Rolling engagement of successive roller surfaces with the worm screw threads provides a highly efficient, substantially non-friction-loss drive.

7 Claims, 6 Drawing Figures

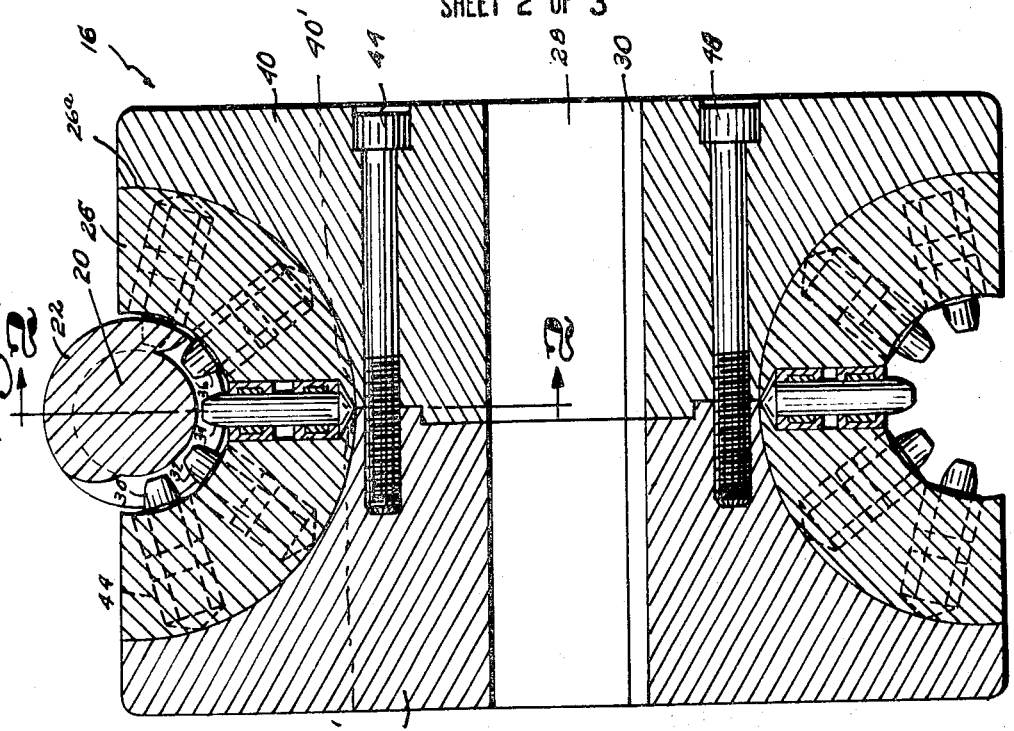

METHOD AND APPARATUS FOR POWER TRANSMISSION UTILIZING A WORM DRIVE

This invention relates to an improved worm drive for power transmission.

In conventional worm and worm wheel power transmission systems, a very sound principle is in effect. However, although these power transimissions are superior to other systems, there are shortcomings of a significant nature. This is due to the high friction losses which occur with the mating of the worm screw with the worm wheel threads under substantial load stresses. Even when encased in oil and utilizing the best of materials and machine tolerances, the worm drive may have a 30 to 40 percent horse power loss from input to output.

It is, therefore, a chief object of the invention to improve methods and means for power transmission generally, and to devise a specific form of worm drive in which friction losses may be substantially reduced or avoided.

It is a further object of the invention to provide in a worm drive power transmission a worm wheel construction in which conventional teeth characterized by relatively high friction loss are replaced by relatively friction-free roller surfaces against which the worm thread may engage with exceedingly high efficiency.

Another object is to provide a combination of roller-retaining means and a bearing structure for supporting same.

It is still a further object of the invention to provide a combination of power transmission means of the class described with a specific application in the form of a vehicle.

I have determined that the foregoing objectives may be realized by means of an improved method and apparatus for power transmission based on the concept of utilizing multiple roller surfaces for transmitting forces exerted through continuously moving screw thread surfaces.

In this general connection, I have conceived of a combination of rollers, roller-retaining structure and bearing means constructed and arranged to position the rollers in such relationship to moving worm screw thread surfaces as to provide for exceedingly high efficiency power transmission.

To this end, I have determined that by providing a plurality of spaced rollers each of whose peripheral surfaces are shaped exactly like the cross-sectional profile of the involute shape of the conventional worm wheel thread, and by positioning the axis of rotation of each of the rollers thus formed in radially disposed relation to the central axis of rotation of the worm screw, I may obtain transmission of power driving forces in a manner such that horse power loss may be reduced to less than 5 percent.

The nature of the invention and its other objects and novel features will be more fully understood and appreciated from the following description of a preferred embodiment of the invention selected for purposes of illustration and shown in the accompanying drawings, in which:

FIG. 2 is a cross-sectional view taken on the line 2—2 of FIG. 3, and illustrating the worm wheel construction of the invention and indicating a worm screw engaged therewith;

FIG. 3 is a cross-sectional view taken on the line 3—3 of FIG. 2 further illustrating the worm screw and worm wheel structure;

Figure 1:
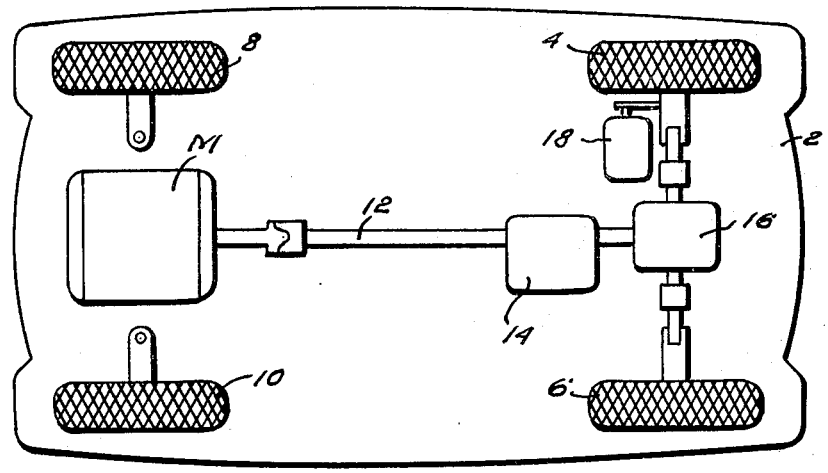
FIG. 1 is a diagrammatic view illustrating the worm drive of the invention in one desirable form in which it is utilized for power transmission in operating a vehicle.

The apparatus shown in the drawings may, I find, constitute one suitable means for carrying out a method of power transmission in which a worm screw mounted for rotative movement about its central axis and presenting continuously moving screw thread surfaces turning around its central axis can be driven with very low friction losses. The method is further carried out by supporting a shaft and worm wheel member, fixed in the shaft, at one side of the worm screw. The continuously moving screw thread surfaces are engaged against successive surfaces of roller members supported around the periphery of the worm wheel in radially disposed relationship to the said central axis of the worm screw, and power driving forces are transmitted with low friction loss through the worm screw and worm wheel to drive the shaft.

As shown in the drawings, the principal parts of the structure indicated therein include in general a worm screw of conventional nature, a shaft member and a special worm wheel structure fixed to the shaft member. The special worm wheel structure comprises an annular roller-retaining body, a plurality of rollers mounted in the roller-retaining body, and bearing means located at either side of the roller-retaining body on the said shaft in a position to support the ring body and provide bearing surfaces for the rollers.

Considering the drawings in greater detail, FIG. 1 illustrates diagrammatically a vehicle 2 provided with wheels 4, 6, 8 and 10. Rear wheels 4 and 6 are designed to be driven by an electric motor M through a drive shaft 12. A simple one-speed gear mechanism 14 provides for reverse and low forward speed drive. For higher speeds, the direct drive of shaft 12 may bypass gear machanism 14 and connect with the worm drive of the invention, generally denoted in the drawing of FIG. 1 by the numeral 16. The worm drive is constructed to have a conventional electric clutch and differential built in as a part of the mechanism in some suitable manner. An electric generator 18 provides for feed-back charge to the batteries employed to power the motor M.

In FIGS. 2 to 6, inclusive, the basic components of the worm drive 16 are indicated on a somewhat larger scale, and as noted therein, numeral 20 refers to a worm screw of conventional form and having a screw thread 22 presenting continuous thread surfaces such as 24 extending around the central axis of rotation of the worm screw.

Figure 4:
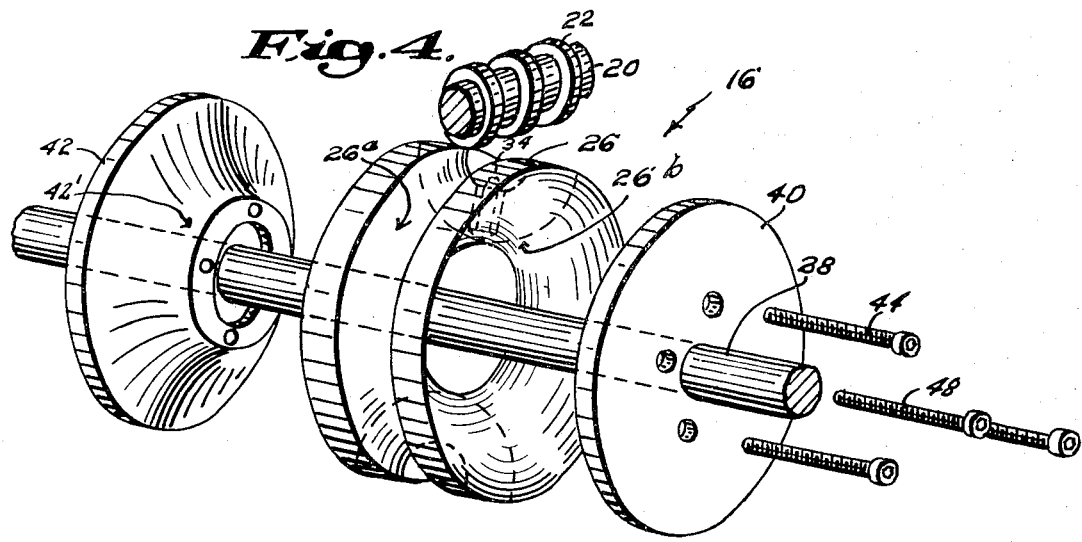
FIG. 4 is an exploded view of the worm screw and worm wheel components indicated in perspective in separated relationship to one another.
Figure 5:
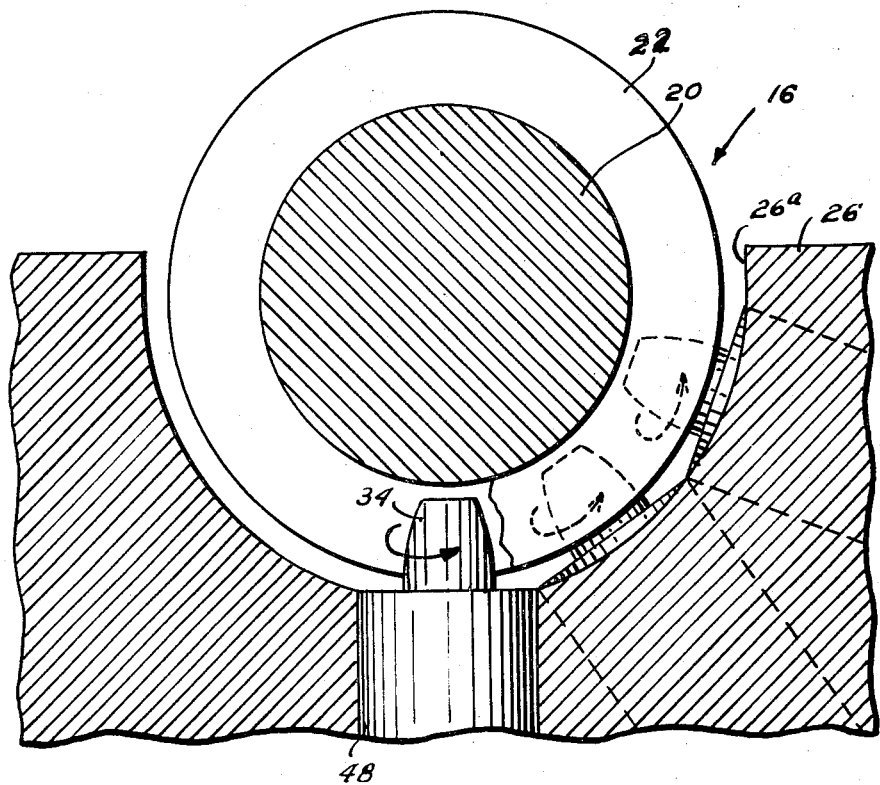
FIG. 5 is a fragmentary cross-sectional view of the worm wheel and roller structure and being illustrative of the rolling engagement of one of the roller members with an adjacent surface of a worm screw thread.

In accordance with the invention, I provide a special worm wheel construction for engagement with the worm screw 20 to provide for low friction power transmission. Included in this worm wheel construction is an annular body 26 having an inner toroidally formed portion which is located around shaft 28 in spaced relation thereto, as best shown in FIG. 4. With this annular body 26, I combine a pair of ring-shaped bearing members 40 and 42 which are formed, as shown in FIG. 4, with bearing surfaces 40' and 42' shaped to coincide with the toroidally formed surfaces 26b of member 26. The bearing members 40 and 42 are fitted around the shaft 28 and secured by some suitable means such as the key member 30 (FIG. 3), and these bearing members are designed to be solidly locked together against either side of the annular body 26 by means of fastening members as 44, 48, etc.

The annular body 26, unlike conventional worm wheels is not formed with gear teeth, being on the contrary provided with a plurality of roller elements 30, 32, 34, 36 and 38 which are hereinafter referred to as roller teeth, and which I have designed to take the place of conventional gear teeth.

An important feature of the invention consists in locating each of these roller teeth in radially disposed relationship to the central axis of rotation of the worm screw 20. Another important feature consists in forming the roller members with s shape which is exactly like the cross section profile of the involute shape of a worm wheel thread suitable for engaging with the screw thread of worm 20.

To this end, I provide in the annular body 26 an outer peripheral surface 26a which is concaved, as best shown in FIGS. 2, 3, 4 and 5. I further locate through the concaved surface 26a spaced apart rows of separated cylindrical roller openings or retaining sockets as indicated at 30', 32', 34', 36', 38', etc. These roller sockets are extended all the way through the annular body 26, as shown in the drawings, to communicate with bearing surfaces as 40' and 42' of the bearing members 40 and 42.

As noted above, each of the roller teeth is made of a shape exactly like the cross sectional profile of the involute shape of a worm wheel thread made to engage with the screw thread 22 of worm 20. In addition, each of the roller teeth is rotatably supported in bearing sleeves as 44, 46, 48, 50 and 52, fixed in the roller sockets 30', 32', 34', 36', 38'. Also the rollers are formed with conical bearing ends as indicated at 54, 56, 58, 60 and 62 which are received against adjacent areas of the bearing surfaces 40' and 42'. By means of this needle bearing arrangement, it will be observed that the rollers are free to turn with substantially no friction loss even when subjected to considerable driving stresses.

Figure 6:
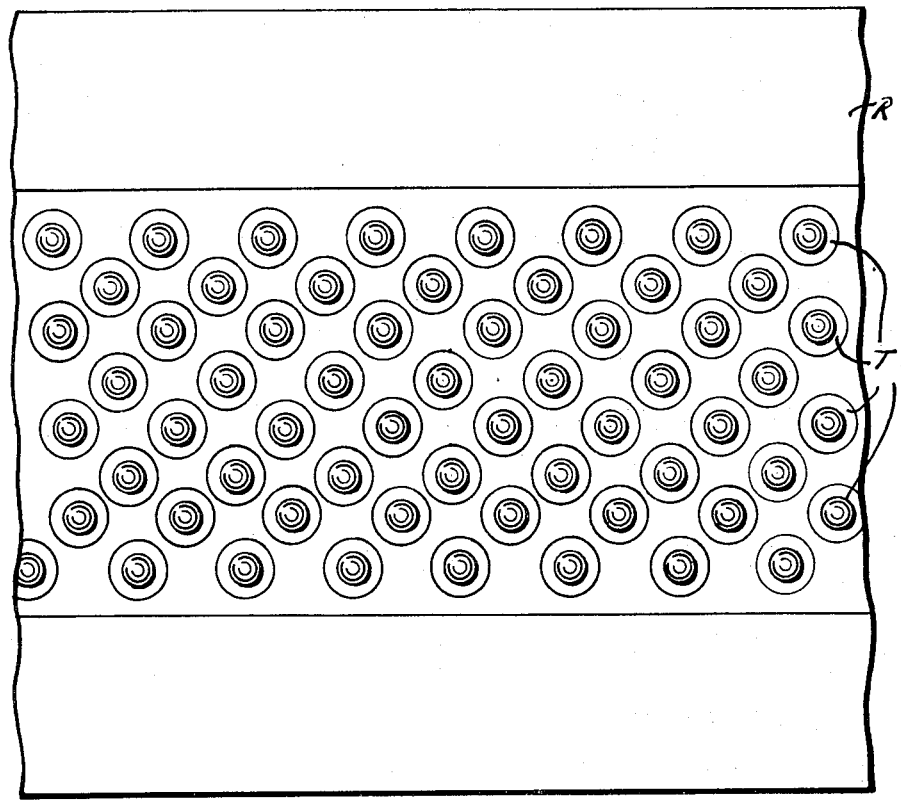
FIG. 6 is a plan view illustrating in developed position a plurality of rollers of the class shown in FIGS. 2 and 3.

In FIG. 6, I have illustrated a development of a typical arrangement of roller teeth T lying in a roller support R and occurring in spaced apart relation in separated rows. The rollers are arranged to extend progressively from side to side of the roller support R in a manner of an involute thread to present successive roller surfaces engageable by the worm screw thread 22 for transmitting power driving forces. It is again pointed out that each of the rollers indicated is placed in a position such that its axis of rotation intersects the axis of rotation of the worm screw.

It is intended that the method and means of the invention may be utilized in connection with various well known thread shapes and as one instance thereof, there may be cited the use of the worm drive of the invention in connection with beveled helical gears accomplished by tipping or angularly positioning the rollers so that they can mate with helical gear teeth.

In the operation of the worm drive, a power imput may, for example, be applied to the worm 20, and the worm thread 22 is engaged with the roller members shown in FIG. 2. As the surfaces 24 of the thread 22 move in a helical path into engagement with successive rows of roller members, a highly efficient power transmission takes place through the worm wheel apparatus 16 with the power transmission force being delivered at the end of the shaft 28.

It is pointed out that a highly desirable mechanical advantage is realized by the use of the rollers described because of rolling contact of the roller members with thread surfaces. This is illustrated, for example, by the roller 34 in FIG. 5 being in rolling contact with a thread surface 24, whereby friction losses are almost completely eliminated or substantially avoided. The dotted line positions shown in FIG. 5 indicate progressive rolling travel of the roller 34 along a thread surface 22.

Because of the high speeds generated by turbines and certain other motivating means, conventional worm drives being made of bronze will not accept the input speed for reduction without incurring friction problems and undesirable wear. The worm drive of my invention, however, has a remarkably low friction loss thus high imput speeds can be accommodated without difficulty or wear. This is due to the unique rolling contact of the threaded surfaces as disclosed. As typical of high input speeds from turbines, there may be cited speeds of from 35,000 to 45,000 r.p.m. and higher.

The efficiency of the worm drive described as earlier pointed out may be very effective in eliminating transmission, rear end gears and other friction loss type drivers. As shown in FIG. 1, the worm drive may be used to connect with rear wheels. However, it could also be connected to provide a front wheel drive or various other arrangements. It will be appreciated that the drive is equally effective for other types of engines such as turbines or Wankel engines.

I claim:

1. An improved worm drive construction for power transmission including a worm screw formed with a screw thread presenting continuous screw thread surfaces extending around the central axis of rotation of the worm screw, a worm wheel construction having an annular roller supporting body formed with an outer concaved periphery and an inner toroidally shaped surface, said outer concaved periphery being recessed to form a plurality of roller retaining sockets, roller members mounted in the sockets for rotation about axes which extend radially inwardly in relation to the central axis of rotation of the worm screw.

2. A worm drive, according to claim 1, in which the worm wheel construction further includes bearing elements formed with toroidally shaped surfaces complementary to the toroidal surface of the annular roller supporting body and secured at either side thereof to provide bearing surfaces with which the roller retaining sockets communicate.

3. A worm drive according to claim 2 in which the roller members at their lower ends are formed with conically shaped extremities received through the roller supporting sockets in bearing contact with the toroidally shaped surfaces of the bearing elements.

4. A worm drive according to claim 3 in which roller members are located in spaced apart relation and occur in separated rows which extend from side to side of the concaved periphery of the annular roller support to present progressively advancing roller surfaces with which the worm screw thread may engage when rotated.

5. A structure according to claim 4 in which each of the rollers is made with a shape which is exactly like the cross sectional profile of an involute worm wheel thread corresponding to the worm screw thread.

6. An improved worm drive construction for power transmission, said worm drive construction including a worm screw rotatable about its longitudinal axis, a roller support member rotatable about another longitudinal axis of rotation which extends at right angles to the said first axis of rotation of the worm screw, a plurality of roller elements supported around the outer surface of the roller support in spaced staggered relationship, said roller elements being rotatable about axes of rotation which intersect the said longitudinal axis of the roller support at axially separated points therealong, and each of the said axes of rotation of the roller elements being movable into and out of intersecting relationship to the longitudinal axis of the worm screw during rotative movement of the roller support.

7. An improved worm drive construction for power transmission, said worm drive construction including a worm screw formed with a screw thread presenting continuous screw thread surfaces extending around the central longitudinal axis of rotation of the worm screw, a worm wheel mounted for rotation about its longitudinal axis at right angles to the said axis of rotation of the worm screw, said worm wheel including a roller support structure formed with a concaved outer peripheral surface, a plurality of cylindrical roller elements received in the roller support structure in staggered and angularly opposed relationship to one another, said roller elements being rotatable about axes of rotation which intersect the said longitudinal axis of the roller support at axially spaced apart points therealong, and said roller elements having exposed extremities projecting outwardly from the concaved peripheral surface in positions to periodically engage with the said continuous screw thread surfaces of the worm screw.

* * * * *